United States Patent [19]

Kawashima et al.

[11] Patent Number: 5,441,782
[45] Date of Patent: Aug. 15, 1995

[54] PLASTIC LAMINATE HAVING POLYAMIDE RESIN SURFACE LAYER AND FLUORORESIN SURFACE LAYER

[75] Inventors: Chikashi Kawashima, Tokyo; Seiichi Yoshida, Saitama; Sunao Koga, Saitama; Satoshi Nakahata, Saitama; Fumiyoshi Yoshikawa, Saitama, all of Japan

[73] Assignee: Central Glass Company, Limited, Yamaguchi, Japan

[21] Appl. No.: 912,197

[22] Filed: Jul. 13, 1992

[30] Foreign Application Priority Data

Jul. 16, 1991 [JP] Japan ................... 3-175525
Jan. 22, 1992 [JP] Japan ................... 4-009487
Feb. 14, 1992 [JP] Japan ................... 4-28337

[51] Int. Cl.$^6$ ............ B32B 7/00; B32B 27/00; F16L 11/00
[52] U.S. Cl. ........................ 428/36.9; 428/421; 428/422; 428/474.4; 428/474.7; 428/474.9; 428/475.5; 428/476.1; 428/475.8; 138/137; 138/141
[58] Field of Search ............. 428/421, 422, 474.4, 428/474.7, 474.9, 475.5, 476.1, 475.8, 36.9, 36.7, 36.6; 525/276, 281, 66, 420, 179; 138/141, 142, 137, 146, DIG. 3, DIG. 7

[56] References Cited

U.S. PATENT DOCUMENTS

| 4,472,557 | 9/1984 | Kawashima et al. | 525/276 |
| 4,652,592 | 3/1987 | Kawashima et al. | 525/281 |
| 4,800,109 | 1/1989 | Washizu | 428/421 |
| 4,886,689 | 12/1989 | Kotliar et al. | 428/422 |
| 4,910,258 | 3/1990 | Inoue et al. | 525/276 |
| 5,122,569 | 6/1992 | Scheibelhoffer et al. | 525/66 |

FOREIGN PATENT DOCUMENTS 0132583 2/1985 European Pat. Off.
0284714 10/1988 European Pat. Off.

OTHER PUBLICATIONS

Abstract of JP-A-3278949, Database WPIL Week 9205, Derwent Publications Ltd., London, GB.

*Primary Examiner*—Paul J. Thibodeau
*Assistant Examiner*—Stephen Sand
*Attorney, Agent, or Firm*—Keck, Mahin & Cate

[57] ABSTRACT

A plastic laminate having an apliphatic polyamide resin surface layer and a fluororesin surface layer is produced by using an intermediate layer formed of a blend of an aliphatic polyamide resin with a fluorine-containing graft copolymer, which is obtained by graft polymerization of a suitable monomer such as vinylidene fluoride, or a mixture of monomers, with an elastomeric copolymer of at least two principal monomers including at least one fluorine-containing monomer, e.g. vinyliden fluoride and chlorotrifluoroethylene, and an unsaturated peroxy compound. The fluorine-containing graft copolymer is a soft, flexible resin and is well compatible with aliphatic polyamide resins and also with various fluororesins. The fluororesin surface layer uses, for example, polyvinylidene fluoride, a vinyliden fluoride based copolymer or the fluorine-containing graft copolymer. The lamination can be accomplished by simply welding the two surface layers to the intermediate layer. The laminate can be produced in tubular form by a coextrusion method and can be used, for example, as an automotive fuel hose.

17 Claims, No Drawings

PLASTIC LAMINATE HAVING POLYAMIDE RESIN SURFACE LAYER AND FLUORORESIN SURFACE LAYER

BACKGROUND OF THE INVENTION

This invention relates to a plastic laminate having a polyamide resin surface layer, a fluororesin surface layer and an intermediate layer of a resin blend. In the laminate the both surface layers are welded to the intermediate layer. The plastic laminate can be produced in sheet form or tubular form.

In this specification the term "polyamide" always refers to an aliphatic polyamide that is called nylon. Polyamide resins have well balanced properties and are excellent particularly in mechanical strength, toughness, wear and abrasion resistance, moldability and workability. Accordingly polyamide resins are largely used as molding materials for automotive parts, electric parts, general machine parts, etc. Besides, flexible nylon resins which are below about 5000 kgf/cm$^2$ in tensile modulus of elasticity are used for pipes and hoses in automated machines, industrial robots, automobiles, etc.

In expanding the use of polyamide resins there is a problem that polyamide resins are rather inferior in acid resistance and methanol resistance. For example, in the case of an automotive fuel hose using a flexible nylon resin such as nylon 11 or nylon 12 the hose is short in service life if sour gasoline frequently flows in the hose, and the nylon resin hose can hardly be used for methanol or a mixed fuel containing methanol because the nylon resin is easily swelled by methanol.

Fluororesins are excellent in chemical resistance and weather resistance, but fluororesins are generally costly. Therefore, various attempts have been made to produce a plastic laminate having a polyamide layer and a fluororesin layer. However, it is very difficult and almost impracticable to produce such a laminate by welding the two kinds of resin layers because fluororesins are generally poor in compatibility with different resins. Therefore it is usual to accomplish the aimed lamination by using an adhesive and making a pretreatment of a surface of the fluororesin layer such as a corona discharge treatment or a chemical etching treatment, and hence the lamination process complicates and entails troublesome operations especially in the case of producing a laminated pipe or hose.

SUMMARY OF THE INVENTION

It is an object of the present invention to provide a plastic laminate, which has a polyamide resin surface layer and a fluororesin surface layer having excellent resistance to chemicals including acids and methanol and can be produced by a welding method without need of any pretreatment of either of the polyamide resin layer and the fluororesin layer.

According to the invention there is provided a plastic laminate which comprises a first surface layer formed of an aliphatic polyamide resin having a melting temperature not higher than 280° C., a second surface layer formed of a fluororesin and an intermediate layer which is tightly interposed between the first and second surface layers and welded to the both surface layers. The intermediate layer is formed of a resin blend which comprises an aliphatic polyamide resin and a fluorine-containing graft copolymer having a trunk polymer which is an elastomeric copolymer of at least two principal monomers including at least one fluorine-containing monomer and a subsidiary monomer having at least one double bond and peroxy group and has a glass transition temperature lower than 25° C. and a branch polymer which is a fluorine-containing crystalline polymer.

Fluorine-containing graft copolymers useful in this invention are disclosed in U.S. Pat. No. 4,472,557. We have discovered that some of the fluorine-containing graft copolymers disclosed in the patent are well compatible with aliphatic polyamide resins such as nylon 6, nylon 66, nylon 11 and nylon 12 and also with several kinds of known fluororesins and that a blend of a selected fluorine-containing graft copolymer and a polyamide resin is very suitable for insertion between a polyamide resin layer and a fluororesin layer to produce a desired laminate by a simple welding method. The selected fluorine-containing graft copolymer itself serves as a soft and flexible fluororesin that can easily be shaped by extrusion and other conventional molding methods.

In the graft copolymers used in this invention a preferred example of the trunk polymer, viz. elastomeric copolymer having peroxy groups, is a copolymer of vinylidene fluoride (VDF), chlorotrifluoroethylene (CTFE) and a relatively small amount of an unsaturated peroxy compound such as t-butyl peroxyallylcarbonate.

In the graft copolymers used in this invention the branch polymer is polyvinylidene fluoride (PVDF), a VDF based copolymer or an ethylene-fluoroofefin copolymer. That is, a desired graft copolymer is obtained by graft polymerization of VDF monomer or a mixture of monomers for the desired branch polymer with an elastomeric copolymer employed as the trunk polymer. The graft polymerization is accomplished by using thermal decomposition of the peroxy groups in the trunk polymer.

In a laminate according to the invention the intermediate layer is formed of a resin blend which is essentially a blend of a fluorine-containing graft copolymer and an aliphatic polyamide resin, and it is optional to modify this resin blend to a ternary blend by the addition of a polymer which can be employed as the branch polymer of a graft copolymer useful in this invention.

The laminate has a fluororesin surface layer. The fluororesin of this surface layer is any of (i) a fluorine-containing graft copolymer (FGC), (ii) PVDF, (iii) a blend of PVDF and a FGC, (iv) a copolymer of VDF and at least one other fluorine-containing monomer, (v) a blend of the VDF based copolymer and a FGC, (vi) a copolymer of ethylene and a fluoroolefin, which may optionally include another fluorine-containing monomer and (vii) a blend of the ethylene-fluoroolefin copolymer and a FGC.

A plastic laminate according to the invention is useful in either sheet form or tubular form. In the case of a tubular laminate usually the fluororesin surface layer becomes the inner surface layer. For example the laminate in sheet form provides gaskets having good resistance to various chemicals. A laminated tube, pipe or hose according to the invention can be produced by a coextrusion method since the lamination of the three layers can be accomplished simply by welding. Therefore, it is particularly advantageous to use the invention for an automotive fuel hose which is required to be resistant to either methanol or sour gasoline.

DESCRIPTION OF THE PREFERRED EMBODIMENTS

This invention uses an aliphatic polyamide resin which has a melting temperature lower than 280° C. The polyamide resin can be selected from conventional nylon resins such as, for example, nylon 6, nylon 66, nylon 11 and nylon 12. When the laminate is in the form of pipe or hose it is preferable to select a flexible nylon which is lower than 5000 kgf/cm$^2$ in tensile modulus of elasticity, such as nylon 11 or nylon 12. If desired it is possible to use a flexible nylon resin containing a plasticizer.

In a fluorine-containing graft copolymer (FGC) used in this invention the trunk polymer is an elastomeric copolymer having a glass transition temperature lower than 25° C. as the trunk polymer. The flexibility and softness of the graft copolymer are mainly attributed to this elastomeric copolymer. The principal monomers for this elastomeric copolymer can be selected from various combinations. It is preferable to employ a combination of two or three fluorine-containing compounds, but it is also possible to use a combination of at least one fluorine-containing compound and at least one unsubstituted olefin such as, for example, ethylene and-/or propylene. More particularly it is preferred to employ a combination of VDF and CTFE, combination of VDF and hexafluoropropene (HFP), combination of VDF, HFP and tetrafluoroethylene (TFE). As to the subsidiary monomer having at least one double bond and peroxy group, examples of useful compounds are unsaturated peroxyesters such as t-butyl peroxymethacrylate and t-butyl peroxycrotonate and unsaturated peroxycarboantes such as t-butyl peroxyallylcarbonate and p-menthane peroxyallylcarbonate. It suffices to mix a relatively small amount of such an unsaturated peroxide with the above described principal monomers. In general it suffices that the unsaturated peroxide monomer amounts to about 0.05 to 5 wt % of the monomer mixture to be copolymerized.

In the FGC the branch polymer is PVDF, a copolymer of VDF and at least one other fluorine-containing monomer or a copolymer of ethylene and a fluoroolefin. It is preferable that in the FGC the weight ratio of the branch polymer to the trunk polymer is in the range from 20:100 to 80:100. When the amount of the branch polymer is less than 20 parts by weight it is not easy to accomplish good blending of the FGC with another fluororesin or a polyamide resin by melt blending. When the amount of the branch polymer is more than 80 parts by weight it is likely that both the FGC and a blend of the FGC with a flexible nylon resin are insufficient in softness or flexibility.

In preparing a blend of a selected FGC with a polyamide resin and/or another fluororesin, the blending is usually accomplished by a melt blending method using, for example, a twin-roll kneader or an extruder.

As to a resin blend for the intermediate layer of a laminate according to the invention, it is suitable to blend 10–120 parts by weight of a polyamide resin with 100 parts by weight of a FGC or a mixture of a FGC and another polymer selected from PVDF, VDF based copolymers and ethylene-fluoroolefin copolymers. If the amount of the polyamide resin is less than 10 parts the intermediate layer may not be sufficiently high in the strength of weld adhesion to the polyamide resin surface layer. If the amount of the polyamide resin is more than 120 parts the strength of weld adhesion of the intermediate layer to the fluororesin surface layer may not be sufficiently high. In the case of a ternary resin blend it is suitable that the weight ratio of the third polymer to the FGC is not greater than 1 because the incorporation of an excessively large amount of a third polymer mars the compatibility of the resin blend with polyamide resins.

PVDF is useful in this invention as the material of the fluororesin surface layer of the laminate. PVDF is excellent in chemical resistance, but PVDF is a highly crystalline and relatively hard resin. Therefore, when it is desired to obtain a flexible laminate by using PVDF in the surface layer it is suitable to use a FGC having branch segments of either PVDF or a VDF based copolymer (described below) or a blend of such a FGC with PVDF. When the surface layer uses PVDF in any of these manners, the resin blend for the intermediate layer uses a FGC in which the branch polymer is PVDF or a VDF based copolymer, and the resin blend may be a ternary blend including PVDF or a VDF based copolymer.

A fluororesin that is better than PVDF in impact resistance at low temperatures can be obtained by copolymerization of VDF with at least one other fluorine-containing monomer. When a laminate according to the invention is required to have good impact resistance at low temperatures (e.g. even at −40° C.) as in the case of an automotive fuel hose, it is suitable to use a VDF based copolymer in the fluororesin surface layer. A suitable copolymer can be selected from binary copolymers such as VDF and tetrafluoroethylene (TFE), VDF and CTFE, VDF and trifluoroethylene (TrFE), VDF and hexafluoropropene (HFP), VDF and hexafluoroacetone (HFA) and VDF and vinyl fluoride (VF), and it is also possible to use a ternary copolymer such as VDF-HFP-TFE copolymer. In any case it is preferable that VDF occupies at least 50 mol % of the binary or ternary copolymer. Also it is possible to use, as the material of the fluororesin surface layer, a FGC having branch segments of a VDF based copolymer preferably containing at least 50 mol % of VDF or a blend of that graft copolymer and a VDF based copolymer.

When a VDF based copolymer is used in the fluororesin surface layer the resin blend for the intermediate layer uses a FGC having branch segments of PVDF or a VDF based copolymer preferably containing at least 50 mol % of VDF, and the resin blend may be a ternary blend including PVDF or a VDF based copolymer.

Another fluororesin that can be used in the fluororesin surface layer of the laminate is a copolymer of ethylene and a fluoroolefin. As the fluoroolefin it is preferable to use CTFE, TFE or TrFE. It is suitable that the fluoroolefin occupies 40–60 mol % of the copolymer. If desired, up to 10 mol % of a third component may be incorporated in the ethylene-fluoroolefin copolymer. For example, the third component can be selected from propylene, HFP, 1,1,1,3,3-pentafluoropropene, 3,3,3-trifluoropropene, 2-trifluoromethylpropene, hexafluoroisobutene and perfluoroalkylvinyl ethers. Also it is possible to use a FGC having branch segments of an ethylene-fluoroolefin copolymer or a blend of such a FGC with an ethylene-fluoroolefin copolymer.

When an ethylene-fluoroolefin copolymer is used in the fluororesin surface layer the resin blend for the intermediate layer uses a FGC having branch segment of an ethylene-fluoroolefin copolymer, and the resin blend may be a ternary blend including an ethylene-fluoroolefin copolymer.

In a laminate according to the invention the thickness of each layer is not particularly limited. Usually the intermediate layer is relatively thin. From an economical point of view it is favorable to make the fluororesin surface layer thinner than the polyamide resin surface layer.

In this invention it is possible to add adequate amounts of known additives to the fluororesin for a surface layer of the laminate and/or the polyamide resin for the opposite surface layer for the purpose of improving or modifying some properties of the resin. Examples of additives are organic polymers not containing fluorine, carbon powder, carbon fiber, metal fiber, metal powder, ceramic powder and resin powder.

The following nonlimitative examples are illustrative of the invention.

EXAMPLE 1

1. Preparation of Fluorine-containing Graft Copolymer

Initially a 100-liter stainless steel autoclave was charged with 50 kg of purified water, 100 g of potassium persulfate, 150 g of ammonium perfluorooctanoate and 100 g of t-butyl peroxyallylcarbonate (abbreviated to BPAC). The gas atmosphere in the autoclave was repeatedly replaced by nitrogen gas, and then the gas was purged. After that 12.5 kg of VDF monomer and 7.55 kg of CTFE monomer were introduced into the autoclave, and the resultant mixture was subjected to copolymerization reaction at a temperature of 50° C. for 20 h while continuing stirring. The reaction product was in the state of white latex. From this latex a rubber-like powder was obtained by salting-out treatment. The powder was washed with water, dried in vacuum, then washed with n-hexane to completely remove unreacted residue of BPAC and again dried in vacuum. The dried powder weighed 16 kg. This powder was of an elastomeric copolymer of VDF, CTFE and BPAC. Thermal analysis of this copolymer with a diffraction scanning calorimeter (DSC) revealed the existence of an exothermic peak at 160°–180° C., which was attributed to decomposition of peroxy group. By iodometric titration the content of active oxygen in the copolymer was measured to be 0.042%.

To carry out a graft polymerization reaction, 12 kg of the above copolymer powder was charged in a 100-liter stainless steel autoclave together with 75 kg of 1,1,2-trifluoro-1,2,2-trichloroethane (solvent). The gas atmosphere in the autoclave was repeatedly replaced by nitrogen gas, and then the gas was purged. After that 6 kg of VDF monomer was charged into the autoclave, and the resultant mixture was subjected to polymerization reaction at 95° C. for 24 h with continuous stirring. The reaction product was separated from the solvent and dried to obtain 16.6 kg of a graft copolymer in the form of a white powder. By calculation from the weight of the obtained graft copolymer, the weight ratio of the graft polymerized VDF to the elastomeric trunk copolymer was 38.3:100. This graft copolymer will be referred to as FGC-A.

The graft copolymer FGC-A was pelletized by using an extruder having a diameter of 30 mm (length-to-diameter ratio of the cylinder was 22) at a temperature of 180°–200° C.

2. Preparation of Fluororesin Sheet

This example used a commercial PVDF in the form of pellets, SOLEF 1010 of Solvey Co. The PVDF was melted and kneaded in the aforementioned extruder and, using a sheet-forming die, extruded into a sheet having a width of 150 mm and a thickness of 0.5 mm. The kneading and extruding temperature was 180°–220° C. Besides, a 1.0 mm thick sheet of PVDF was formed by the same method in order to prepare specimens for tensile testing.

3. Preparation of Polyamide Sheet

The polyamide resin used in this example was nylon 12 in the form of pellets supplied from Atochem Co. under the tradename Rilsan AESN 0 P40TL. This nylon 12 was used in the subsequent examples too unless otherwise noted. The nylon 12 was dried at 80° C. for 4 hr and then formed into a sheet having a width of 150 mm and a thickness of 1.0 mm by using the aforementioned extruder and a sheet-forming die. The extruding temperature was 180°–235° C. Besides, 1.5 mm thick and 2.0 mm thick sheets of nylon 12 were formed by the same method for use in comparative examples.

4. Preparation of Blended Resin Sheet

In a tumbler 100 parts by weight of the fluororesin FGC-A was mixed with 50 parts by weight of the aforementioned nylon 12. The mixture was melted and kneaded by using the aforementioned extruder and extruded into a sheet having a width of 150 mm and a thickness of 0.5 mm, The extruding temperature was 180°–235 C. Besides, a 1.0 mm thick sheet of the blended resin was formed by the same method in order to prepare specimens for tensile testing.

5. Tensile Testing of Resin Sheets

The 1 mm thick sheet of PVDF, 1 mm thick sheet of nylon 12 and the 1 mm thick sheet of the blend of FGC-A and nylon 2 were each punched to form dumbbell specimens No. 3 according to JIS K 6301, and each of these specimens was tested with an Instron type tensile tester to obtain a stress-strain curve. The test was made at a temperature of 23° C., and the pulling speed was constantly 10 mm/min. Using the obtained stress-strain curve the tensile modulus of elasticity of each resin sheet was calculated from the inclination of an initial linear part of the curve. Tensile modulus of elasticity can be taken as an indication of the degree of flexibility or softness of each resin.

The tensile moduli of elasticity of the three kinds of resin sheets were as follows.
PVDF sheet: 8600 kgf/cm$^2$
Nylon 12 sheet: 3050 kgf/cm$^2$
FGC-A/nylon 12 blend sheet: 2300 kgf/cm$^2$

6. Fabrication of Laminate

The 0.5 mm thick sheet of PVDF, the 1 mm thick sheet of nylon 12 and the 0.5 mm thick sheet of the blend of FGC-A and nylon 12 were each cut into 100 mm square pieces.

First the 100 mm square sheet of PVDF was placed on a central area of a 200 mm square plate (1 mm thick) of stainless steel. Next the 100 mm square sheet of the blend of FGC-A and nylon 12 was placed on the PVDF sheet, and the 100 mm square sheet of nylon 12 was placed on the blend resin sheet. Then another 200 mm square plate (1 mm thick) of stainless steel was placed on the nylon sheet. As a result a provisional laminate of three resin sheets were sandwiched between a pair of stainless steel plates. The total thickness of the three sheets was 2 mm.

The provisional laminate sandwiched between the stainless steel plates was placed in a compression molding apparatus which was preheated to 200° C. Without applying pressure the provisional laminate was maintained in the heated apparatus for 10 min. After that the provisional laminate was transferred into another compression molding apparatus which was cooled with water, and a pressure of 20 kgf/cm² was applied to the laminate for 5 min. After that the laminate was left to cool. By these heating and pressing operations both the PVDF sheet and the nylon 12 sheet were welded to the intermediate sheet of the blend of FGC-A and nylon 12. That is, the three resin sheets turned into a unitary three-layer laminate having a fluororesin (PVDF) surface layer on one side and a nylon surface layer on the opposite side.

7. Measurement of Peel Strength of Adhesion in Laminate

To prepare test-pieces, the above described lamination process was modified so as to leave the three resin sheets unwelded in a rectangular half area of the 100 mm square laminate by using a 0.1 mm thick film of polytetrafluoroethylene (PTFE) as a welding inhibitor. In preparing the provisional laminate of the three kinds of resin sheets, the PTFE film was interposed between the PVDF sheet and the FGC-A/nylon blend sheet and between the FGC-A/nylon blend sheet and the nylon sheet in a rectangular half area of the 100 mm square sheets (one of two symmetrically half areas: 50 mm in width and 100 mm in length). There was no change in the subsequent heating and pressing operations.

The 100 mm square laminate including the unwelded rectangular area (50 mm wide and 100 mm long) was cut perpendicular to the border between the welded and unwelded areas into 25 mm wide and 100 mm long strips. That is, in each of the obtained strips the welded three-layer laminate occupied a length of 50 mm, and from each layer of the three-layer laminate a 50 mm long tag of a resin sheet extended. These strips were used as test-pieces for measuring the peel strength of adhesion between two adjacent layers in the three-layer laminate by a test method generally in accordance with JIS K 6854. The test was made at room temperature, and the angle of peeling was 180 degrees. On several samples, the peel strength of adhesion between the PVDF layer and the FGC-A/nylon blend layer was 7.0–11.2 kgf/25 mm, and the peel strength of adhesion between the nylon layer and the FGC-A/nylon blend layer was 28.0–35.1 kgf/25 mm.

EXAMPLES 2–4

These examples differed from Example 1 only in that either the graft copolymer FGC-A or a blend of FGC-A and PVDF (SOLEF 1010) was used as a fluororesin in place of PVDF used in Example 1. In Example 2, 100 parts by weight of PVDF was blended with 50 parts by weight of FGC-A. In Example 3, 50 parts by weight of PVDF was blended with 100 parts by weight of FGC-A. In Example 4 FGC-A alone was used. The blending of PVDF and FGC-A was carried out by using a tumbler and the extruder used in Example 1, and in every example the employed fluororesin was extruded into a sheet at temperatures of 180°–220° C.

Table 1 shows the tensile moduli of elasticity of the fluororesins used in Examples 1–4 measured on 1 mm thick specimens.

TABLE 1

|  | Fluororesin PVDF/FGC-A (by weight) | Tensile Modulus of Elasticity (kgf/cm²) |
|---|---|---|
| (Ex. 1) | 100/0 | 8600 |
| (Ex. 2) | 100/50 | 6200 |
| (Ex. 3) | 50/100 | 4000 |
| (Ex. 4) | 0/100 | 1800 |

In each of Examples 2–4 a three-layer laminate was produced by the same process as in Example 1, and peel strength of adhesion between adjacent layers in the laminate was measured. The results are shown in Table 2, wherein PA12 stands for nylon 12.

EXAMPLES 5–8

In these examples a ternary blend of 100 parts by weight of FGC-A, 50 parts by weight of PVDF and 75 parts by weight of nylon 12 was used in place of the binary blend of FGC-A and nylon 12 in Examples 1–4. The tensile modulus of elasticity of this ternary blend was 3600 kgf/cm measured on 1 mm thick specimens. Except for this change, Examples 5–8 were similar to Examples 1–4, respectively. In the three-layer laminates produced in Examples 5–8 the peel strength of adhesion between adjacent layers were as shown in Table 2.

Throughout Examples 1–8 the peel strength test revealed that in the three-layer laminate the adhesion of each surface layer, either the fluororesin layer or the nylon layer, to the intermediate layer was fairly strong and very uniform.

Comparative Examples 1–4

Comparative Examples 1–4 were similar to Examples 1–4, respectively, except that a binary blend of 100 parts by weight of PVDF and 50 parts by weight of nylon 12 was used as the material of the intermediate layer in the three-layer laminate. That is, in the three-layer laminates of Comparative Examples 1–4 the intermediate layer did not contain FGC-A or any alternative soft fluororesin.

Table 2 contains the data of peel strength of adhesion in the laminates of Comparative Examples 1–4. In these laminates the peel strength values exhibited wide dispersion, and the peel strength test revealed that in some local areas either of the two surface layers did not firmly adhere to the intermediate layer.

TABLE 2

|  | Intermediate Layer (2nd layer) FGC-A/PVDF/PA12 (by wt.) | Fluororesin Layer (3rd layer) PVDF/FGC-A (by wt.) | Peel Strength of Adhesion (kgf/25 mm) | |
|---|---|---|---|---|
|  |  |  | 3rd layer–2nd layer | 1st layer[*]–2nd layer |
| Example 1 | 100/0/50 | 100/0 | 7.0–11.2 | 28.0–35.1 |
| Example 2 | " | 100/50 | 7.2–12.5 | " |
| Example 3 | " | 50/100 | 15.0–17.3 | " |
| Example 4 | " | 0/100 | 14.5–17.0 | " |

TABLE 2-continued

|  | Intermediate Layer (2nd layer) FGC-A/PVDF/PA12 (by wt.) | Fluororesin Layer (3rd layer) PVDF/FGC-A (by wt.) | Peel Strength of Adhesion (kgf/25 mm) | |
|---|---|---|---|---|
|  |  |  | 3rd layer–2nd layer | 1st layer*)–2nd layer |
| Example 5 | 100/50/75 | 100/0 | 5.8–8.0 | 30.0–39.2 |
| Example 6 | " | 100/50 | 7.2–9.4 | " |
| Example 7 | " | 50/100 | 9.8–14.2 | " |
| Example 8 | " | 0/100 | 10.8–16.8 | " |
| Comp. Ex. 1 | 0/100/50 | 100/0 | 0.2–10.2 | 0.4–29.8 |
| Comp. Ex. 2 | " | 100/50 | 0.3–6.5 | " |
| Comp. Ex. 3 | " | 50/100 | 0.3–5.7 | " |
| Comp. Ex. 4 | " | 0/100 | 0.4–3.8 | " |

*)1st layer: PA12

Comparative Examples 5–8

As Comparative Examples 5–8 the three-layer laminates of Examples 1–4 were respectively modified to two-layer laminates by omitting the intermediate layer formed of the blend of FGC-A and nylon 12 and increasing the thickness of the nylon 12 layer to 1.5 mm. In the two-layer laminates the peel strength of adhesion between the fluororesin layer and the nylon layer was as shown in Table 3.

TABLE 3

|  | Fluororesin Layer PVDF/FGC-A (by weight) | Peel Strength of Adhesion (to nylon 12 layer) (kgf/25 mm) |
|---|---|---|
| Comp. Ex. 5 | 100/0 | 0–0.1 |
| Comp. Ex. 6 | 100/50 | 0–0.1 |
| Comp. Ex. 7 | 50/100 | 0–0.2 |
| Comp. Ex. 8 | 0/100 | 0–0.4 |

Chemical Resistance of Laminate

The following tests were made to evaluate chemical resistance of the laminates of Examples 1–8. Table 4 shows the results together with the results of the same tests on the laminates of the subsequent examples.

(1) Acid Resistance Test

A lining tester according to ASTM C 868-77 was used, and 60% nitric acid was used as the testing reagent. The test was made at room temperature. In the tester a sample of each laminate was set so as to expose the fluororesin (PVDF and/or FGC-A) layer to the acid, and after the lapse of 30 days a change in the weight of the sample was measured. For comparison, a 2 mm thick sheet of nylon 12 was subjected to the same test. The nylon sheet dissolved in the nitric acid.

(2) Methanol Resistance Test

A stainless steel cup having an inner diameter of 66 mm and a height of about 50 mm was used. The outer surface of the cup was threaded in a top end region. The cup contained 100 ml of methanol, and the open top of the cup was covered by a sample of the three-layer laminate (2 mm thick) which was in the shape of a disc having a diameter of 85 mm. The disc-shaped sample was supported by a wire net and placed such that the fluororesin (PVDF and/or FGC-A) layer faced the methanol in the cup. The sample was secured to the cup by using a threaded annular adapter and a sealant. Then the cup was turned bottom up to thereby bring methanol into contact with the fluororesin layer of the sample laminate. In that state the cup was placed in an oven which was kept heated at 40° C., and the gross weight of the cup inclusive of methanol and the sample laminate was periodically measured to determine the rate of permeation of methanol through the sample laminate. After the lapse of 14 days a change in the weight of the sample laminate was measured. For comparison, a 2 mm thick sheet of nylon 12 was subjected to the same test.

TABLE 4

|  | Chemical Resistance (weight change, %) | | Permeation of Methanol (mg/h) |
|---|---|---|---|
|  | in nitric acid | in methanol | |
| Ex. 1 | 0.15 | 0.2 | 6 |
| Ex. 2 | 0.33 | 0.8 | 8 |
| Ex. 3 | 0.70 | 1.4 | 11 |
| Ex. 4 | 0.81 | 1.6 | 12 |
| Ex. 5 | 0.15 | 0.2 | 3 |
| Ex. 6 | 0.28 | 0.4 | 4 |
| Ex. 7 | 0.64 | 1.3 | 6 |
| Ex. 8 | 0.73 | 1.3 | 8 |
| Ex. 9 | 0.18 | 0.8 | 7 |
| Ex. 10 | 0.35 | 1.8 | 9 |
| Ex. 11 | 0.74 | 1.7 | 12 |
| Ex. 12 | 0.81 | 1.6 | 12 |
| Ex. 13 | 0.17 | 0.8 | 5 |
| Ex. 14 | 0.28 | 1.2 | 7 |
| Ex. 15 | 0.66 | 1.4 | 8 |
| Ex. 16 | 0.73 | 1.5 | 10 |
| Ex. 17 | 0.10 | 0.1 | 3 |
| Ex. 18 | 0.24 | 0.5 | 5 |
| Ex. 19 | 0.65 | 1.3 | 10 |
| Ex. 20 | 0.85 | 1.8 | 12 |
| Ex. 21 | 0.09 | 0.1 | 2 |
| Ex. 22 | 0.21 | 0.3 | 3 |
| Ex. 23 | 0.59 | 1.1 | 7 |
| Ex. 24 | 0.71 | 1.6 | 9 |
| Nylon 12 (2 mm sheet) | dissolved | −8.3 | 21 |

EXAMPLES 9–16

In these examples a commercial copolymer of VDF with TFE (VDF/TFE is about 80/20 by mol) in the form of pellets, KYNAR 7200 of Atochem Co., was used in place of PVDF in Examples 1–8. This copolymer will be referred to as VDFC. Except for this change Examples 9–16 are similar to Examples 1–8, respectively, as can be seen in Table 6. In Examples 9–12 the intermediate layer of the three-layer laminate was formed of a blend of 100 parts by weight of the graft copolymer FGC-A and 50 parts by weight of nylon 12. In Examples 13–16 the intermediate layer was formed of a blend of 100 parts by weight of FGC-A, 50 parts by weight of the copolymer VDFC and 75 parts by weight of nylon 12.

The copolymer VDFC is better than PVDF in impact resistance at low temperatures. This fact was evidenced by the following experiment.

The copolymer VDFC was blended with the graft copolymer FGC-A in selected proportions as shown in Table 5 by using a tumbler and the extruder used in the foregoing examples, and each blend was extruded into a tube having an outer diameter of 8 mm and an inner diameter of 6 mm. The kneading and extruding temperature was 180°–220° C. Similarly, PVDF (SOLEF 1010) used in Examples 1–8 was blended with FGC-A, and each blend was extruded into a tube of the same outer and inner diameters. The obtained fluororesin tubes were subjected to a falling weight impact test according to SAE J844d at −40° C. The weight had a diameter of 31.75 mm and a mass of 0.454 kg, and the impacting tip of the weight had a radius of curvature of 15.88 mm. The falling height was 304.8 mm. The test was made on 6 samples of each tube. The results were as shown in Table 5.

areas either of the two surface layers did not firmly adhere to the intermediate layer.

TABLE 6

|  | Intermediate Layer (2nd layer) FGC-A/VDFC/PA12 (by wt.) | Fluororesin Layer (3rd layer) VDFC/FGC-A (by wt.) | Peel Strength of Adhesion (kgf/25 mm) | |
|---|---|---|---|---|
|  |  |  | 3rd layer– 2nd layer | 1st layer*)– 2nd layer |
| Example 9 | 100/0/50 | 100/0 | 9.8–12.2 | 34.0–38.4 |
| Example 10 | " | 100/50 | 9.5–13.5 | " |
| Example 11 | " | 50/100 | 15.2–17.0 | " |
| Example 12 | " | 0/100 | 14.5–17.0 | " |
| Example 13 | 100/50/75 | 100/0 | 6.5–9.0 | 32.0–40.0 |
| Example 14 | " | 100/50 | 7.8–10.0 | " |
| Example 15 | " | 50/100 | 10.5–15.2 | " |
| Example 16 | " | 0/100 | 11.0–16.9 | " |
| Comp. Ex. 9 | 0/100/50 | 100/0 | 0.3–11.3 | 0.4–30.5 |
| Comp. Ex. 10 | " | 100/50 | 0.3–7.2 | " |
| Comp. Ex. 11 | " | 50/100 | 0.3–6.3 | " |
| Comp. Ex. 12 | " | 0/100 | 0.4–4.5 | " |

*)1st layer: PA12

TABLE 5

| Blending Ratio (by wt.) | | | Number of |
|---|---|---|---|
| VDFC | PVDF | FGC-A | Broken Samples |
| 100 | — | 0 | 0/6 |
| 100 | — | 50 | 0/6 |
| 100 | — | 100 | 0/6 |
| 50 | — | 100 | 1/6 |
| 0 | — | 100 | 4/6 |
| — | 100 | 0 | 6/6 |
| — | 100 | 50 | 6/6 |
| — | 100 | 100 | 6/6 |
| — | 50 | 100 | 6/6 |

In the three-layer laminates of Examples 9–16 the peel strength of adhesion between adjacent layers were as shown in Table 6. The peel strength test revealed that in every example the surface layers on both sides were very uniformly welded to the intermediate layer.

The laminates of Examples 9–16 also were subjected to the acid resistance test and the methanol resistance test described hereinbefore. The results are shown in Table 4.

Comparative Examples 9–12

Comparative examples 9–12 were similar to Examples 9–12, respectively, except that a binary blend of 100 parts by weight of the copolymer VDFC and 50 parts by weight of nylon 12 was used as the material of the intermediate layer in the three-layer laminate. That is, FGC-A was not used in the intermediate layer.

Table 6 contains the data of peel strength of adhesion in the laminates of Comparative Examples 9–12. In these laminates the peel strength values exhibited wide dispersion, and the peel test revealed that in some local Comparative Examples 13–16

As Comparative Examples 13–16 the three-layer laminates of Examples 9–12 were respectively modified to two-layer laminates by omitting the intermediate layer formed of the blend of FGC-A and nylon 12 and increasing the thickness of the nylon 12 layer to 1.5 mm. In the two-layer laminates the peel strength of adhesion between the fluororesin layer and the nylon layer was as shown in Table 7.

TABLE 7

|  | Fluororesin Layer VDFC/FGC-A (by weight) | Peel Strength of Adhesion (to nylon 12 layer) (kgf/25 mm) |
|---|---|---|
| Comp. Ex. 13 | 100/0 | 0–0.2 |
| Comp. Ex. 14 | 100/50 | 0–0.3 |
| Comp. Ex. 15 | 50/100 | 0–0.4 |
| Comp. Ex. 16 | 0/100 | 0–0.4 |

EXAMPLES 17–24

In these examples a commercial copolymer of ethylene and CTFE (ethylene/CTFE is about 50—50 by mol) in the form of pellets, HALAR 500 of Allied Chemicals Co., was used in place of PVDF in Examples 1–8. This copolymer will be referred to as ECTFE.

In place of the fluorine-containing graft copolymer FGC-A used in the foregoing examples, Examples 17–24 used another fluorine-containing graft copolymer FGC-B in which the branch polymer was a copolymer of ethylene and CTFE. The graft copolymer FGC-B was prepared by the following process.

Initially a 100-liter stainless steel autoclave was charged with 150 kg of purified water, 400 g of potassium persulfate, 50 g of ammonium perfluorooctanoate, 500 g of potassium dihydrogenphosphate and 200 g of t-butyl peroxyallylcarbonate (BPAC) in the form of 5% solution in 1,1,2-trifluoro-1,2,2-trichloroethane. The gas atmosphere in the autoclave was repeatedly replaced by nitrogen gas, and then the gas was purged. After that 15 kg of VDF monomer and 12.2 kg of CTFE monomer were introduced into the autoclave, and the resultant mixture was subjected to copolymerization reaction under pressure of 10–13 kg/cm at a temperature of 50° C. for 10 h while continuing stirring. The reaction product was 145.5 kg of white latex in which the concentration of solid copolymer was 16.5%.

To carry out a graft polymerization reaction, 136.7 kg of the above latex (i.e. 22.56 kg of a copolymer of VDF, CTFE and BPAC) was charged in a 300 liter stainless steel autoclave together with 45.5 kg of purified water and 50 g of ammonium perfluorooctanoate. The gas atmosphere in the autoclave was repeatedly replaced by nitrogen gas, and then the gas was purged. After that 1 liter of 5% aqueous solution of sodium sulfite was added, and then 15.4 kg of CTFE monomer and 3.7 kg of ethylene monomer were gradually charged into the autoclave by dividing the prescribed quantity of each monomer into three portions. The resultant mixture was subjected to polymerization reaction under pressure of 3–12 kg/cm at a temperature of 40° C. for 16 h. The reaction product was in the form of a slurry. Using a centrifuge a solid product was taken out of the slurry, and the solid product was dried at 80° C. for 2 days to obtain 35.7 kg of a graft copolymer in the form of a white powder. In this graft copolymer the amount of the ethylene/CTFE copolymer was 36.8 wt %.

The obtained graft copolymer, FGC-B, was pelletized by the method employed to pelletize the copolymer FGC-A in Example 1.

The polyamide resin used in Examples 17–24 was nylon 12 in the form of pellets supplied from Ube Industries, Ltd. under the tradename of 3035JU.

Except for the above changes in the resin materials, the resin blending operations, sheet forming operations and laminating operations in Examples 1–8 were repeated in Examples 17–24.

The tensile moduli of elasticity of the three kinds of resins, measured on 1 mm thick sheets, were as follows.

ECTFE: 16800 kgf/cm²
FGC-B: 1300 kgf/cm²
Nylon 12: 2900 kgf/cm²

Table 8 shows the tensile moduli of elasticity of blends of ECTFE and FGC-B measured on 1 mm thick sheets.

TABLE 8

| Blend ECTFE/FGC-B (by weight) | Tensile Modulus of Elasticity (kgf/cm²) |
|---|---|
| 100/50 | 6100 |
| 100/100 | 4700 |
| 50/100 | 3900 |

As shown in Table 8, in Examples 17–20 the intermediate layer of the three-layer laminate was formed of a blend of 100 parts by weight of the graft copolymer FGC-B and 50 parts by weight of nylon 12. The tensile moduli of elasticity of this blend in the form of 1 mm thick sheet was 2300 kgf/cm². In Examples 21–24 the intermediate layer was formed of a ternary blend of 100 parts by weight of FGC-B, 50 parts by weight of ECTFE and 50 parts by weight of nylon 12. The tensile moduli of elasticity of this blend in the form of 1 mm thick sheet was 3500 kgf/cm².

In every example the three-layer laminate had a surface layer of nylon 12 and another surface layer of a fluororesin which was, as shown in Table 9, ECTFE, FGC-B or a blend of ECTFE and FGC-B.

In the three-layer laminates of Examples 17–24 the peel strength of adhesion between adjacent layers were as shown in Table 9. The peel strength test revealed that in every example the surface layers on both sides were very uniformly welded to the intermediate layer.

The laminates of Examples 17–24 also were subjected to the acid resistance test and the methanol resistance test described hereinbefore. The results are shown in Table 4.

Comparative Examples 17–20

Comparative examples 17–20 were similar to Examples 17–20, respectively, except that a binary blend of 100 parts by weight of the copolymer ECTFE and 50 parts by weight of nylon 12 was used as the material of the intermediate layer in the three-layer laminate. That is, FGC-B was not used in the intermediate layer.

Table 9 contains the data of peel strength of adhesion in the laminates of Comparative Examples 17–20. In these laminates the peel strength values exhibited wide dispersion, and the peel test revealed that in some local areas either of the two surface layers did not firmly adhere to the intermediate layer.

TABLE 9

| | Intermediate Layer (2nd layer) FGC-B/ECTFE/PA12 (by wt.) | Fluororesin Layer (3rd layer) ECTFE/FGC-B (by wt.) | Peel Strength of Adhesion (kgf/25 mm) | |
|---|---|---|---|---|
| | | | 3rd layer–2nd layer | 1st layer*)–2nd layer |
| Example 17 | 100/0/50 | 100/0 | 6.2–8.0 | 13.5–16.9 |
| Example 18 | " | 100/50 | 7.3–12.5 | " |
| Example 19 | " | 50/100 | 8.9–13.2 | " |
| Example 20 | " | 0/100 | 10.3–14.5 | " |
| Example 21 | 100/50/50 | 100/0 | 6.0–8.2 | 10.8–15.2 |
| Example 22 | " | 100/50 | 6.5–11.0 | " |
| Example 23 | " | 50/100 | 7.8–11.9 | " |
| Example 24 | " | 0/100 | 8.6–13.1 | " |
| Comp. Ex. 17 | 0/100/50 | 100/0 | 0.1–8.3 | 0.2–16.2 |
| Comp. Ex. 18 | " | 100/50 | 0.2–8.0 | " |
| Comp. Ex. 19 | " | 50/100 | 0.3–7.6 | " |
| Comp. Ex. 20 | " | 0/100 | 0.3–7.2 | " |

*)1st layer: PA12

Comparative Examples 21–24

As Comparative Examples 21–24 the three-layer laminates of Examples 17–20 were respectively modified to two-layer laminates by omitting the intermediate layer formed of the blend of FGC-B and nylon 12 and increasing the thickness of the nylon 12 layer to 1.5 mm. In the two-layer laminates the peel strength of adhesion between the fluororesin layer and the nylon layer was as shown in Table 10.

TABLE 10

|  | Fluororesin Layer ECTFE/FGC-B (by weight) | Peel Strength of Adhesion (to nylon 12 layer) (kgf/25 mm) |
| --- | --- | --- |
| Comp. Ex. 21 | 100/0 | 0–0.5 |
| Comp. Ex. 22 | 100/50 | 0–0.6 |
| Comp. Ex. 23 | 50/100 | 0–0.6 |
| Comp. Ex. 24 | 0/100 | 0–0.7 |

What is claimed is:

1. A plastic laminate comprising:
a first surface layer formed of an aliphatic polyamide resin having a melting temperature not higher than 280° C.;
a second surface layer formed of a fluororesin selected from the group consisting of polyvinylidene fluoride, a vinylidene fluoride copolymer, a fluorine-containing graft copolymer, a blend of polyvinylidene fluoride with said graft copolymer, and a blend of said vinylidene fluoride based copolymer with said graft copolymer, said vinylidene fluoride based copolymer being a copolymer of vinylidene fluoride with at least one other fluorine-containing monomer, said graft copolymer consisting of a trunk polymer and a branch polymer which is polyvinylidene fluoride, said trunk polymer consisting of an elastomeric copolymer of vinylidene fluoride, chlorotrifluoroethylene and another monomer, said another monomer having at least one double bond and peroxy group and amounting to about 0.05 to 5 wt % of a mixture of said vinylidene fluoride, said chlorofluoroethylene and said another monomer to be copolymerized, said trunk polymer having a glass transition temperature lower than 25° C.; and
an intermediate layer which is interposed between said first and second surface layers and welded to the first and second surface layers, said intermediate layer being formed of a resin blend consisting of an aliphatic polyamide resin, said fluorine-containing graft copolymer and an optional component, said optional component being a member selected from the group consisting of polyvinylidene fluoride and a copolymer of vinylidene fluoride with at least one other fluorine-containing monomer.

2. A laminate according to claim 1, wherein in both the graft copolymer in said second surface layer and the graft copolymer in said intermediate layer the weight ratio of said branch polymer to said trunk polymer is in the range from 20:100 to 80:100.

3. A laminate according to claim 1, wherein the polyamide resin in said first surface layer and the polyamide resin in said intermediate layer are each selected from the group consisting of nylon 11 and nylon 12.

4. A laminate according to claim 1, wherein said vinylidene fluoride based copolymer comprises at least 50 mol % of vinylidene fluoride and is selected from the group consisting of copolymer of vinylidene fluoride and tetrafluoroethylene, copolymer of vinylidene fluoride and chlorotrifluoroethylene, copolymer of vinylidene fluoride and trifluoroethylene, copolymer of vinylidene fluoride and hexafluoropropene, copolymer of vinylidene fluoride and hexafluoroacetone, copolymer of vinylidene fluoride and vinyl fluoride and copolymer of vinylidene fluoride, hexafluoropropene and tetrafluoroethylene.

5. A laminate according to claim 1, wherein said resin blend is a binary blend of 10–120 parts by weight of the polyamide resin with 100 parts by weight of the graft copolymer.

6. A laminate according to claim 1, wherein in said resin blend the weight ratio of said optional component to the graft copolymer is not greater than 1 and the weight ratio of the polyamide resin to the total of the graft copolymer and said optional component is from 0.1 to 1.2.

7. A laminate according to claim 1, wherein said another monomer is selected from the group consisting of t-butyl peroxymethacrylate, t-butyl peroxycrotonate, t-butyl peroxyallylcarbonate and p-menthane peroxyallylcarbonate.

8. A laminate according to claim 1, which is in the form of a hose in which the inner surface layer is said second surface layer.

9. A plastic laminate comprising:
a first surface layer formed of an aliphatic polyamide resin having a melting temperature not higher than 280° C.;
a second surface layer formed of a fluororesin selected from the group consisting of a fluoroolefin copolymer, a graft copolymer, and a blend of said fluoroolefin copolymer with said graft copolymer, said graft copolymer consisting of a trunk polymer and a branch polymer, said trunk polymer being an elastomeric copolymer of vinylidene fluoride, chlorotrifluoroethylene and another monomer, said another monomer having at least one double bond and peroxy group and amounting to about 0.05 to 5 wt % of a mixture of said vinylidene fluoride, said chlorotrifluoroethylene and said another monomer to be copolymerized, said branch polymer being a copolymer of ethylene and chlorotrifluoroethylene, said trunk polymer having a glass transition temperature lower than 25° C.; and
an intermediate layer which is interposed between said first and second surface layers and welded to the first and second surface layers, said intermediate layer being formed of a resin blend consisting of an aliphatic polyamide resin, said fluorine-containing graft copolymer and an optional component, said optional component being a copolymer of chlorotrifluoroethylene with ethylene.

10. A laminate according to claim 9, wherein in both the graft copolymer in said second surface layer and the graft copolymer in said intermediate layer the weight ratio of said branch polymer to said trunk polymer is in the range from 20:100 to 80:100.

11. A laminate according to claim 9, wherein the polyamide resin in said first surface layer and the polyamide resin in said intermediate layer are each selected from the group consisting of nylon 11 and nylon 12.

12. A laminate according to claim 9, wherein said fluoroolefin in said fluoroolefin copolymer is selected from the group consisting of tetrafluoroethylene, chlorotrifluoroethylene and trifluoroethylene and comprises 40–60 mol % of said fluoroolefin copolymer.

13. A laminate according to claim 12, wherein said fluoroolefin copolymer further comprises not more than 10 mol % of a third component which is selected from the group consisting of propylene, hexafluoropropene, 1,1,1,3,3-pentafluoropropene, 3,3,3-trifluoropropene, 2-trifluoromethylpropene, hexafluoroisobutene and perfluoroalkylvinyl ethers.

14. A laminate according to claim 9, wherein said resin blend is a binary blend of 10–120 parts by weight of the polyamide resin with 100 parts by weight of the graft copolymer.

15. A laminate according to claim 9, wherein in said resin blend the weight ratio of said optional component to the graft copolymer is not greater than 1 and the weight ratio of the polyamide resin to the total of the graft copolymer and said optional component is from 0.1 to 1.2.

16. A laminate according to claim 9, wherein said another monomer is selected from the group consisting of t-butyl peroxymethacrylate, t-butyl peroxycrotonate, t-butyl peroxyallylcarbonate and p-menthane peroxyallylcarbonate.

17. A laminate according to claim 9, which is in the form of a hose in which the inner surface layer is said second surface layer.

* * * * *